Nov. 22, 1955   T. O. SUMMERS, JR., ET AL   2,724,281
SELF-ADJUSTING FRICTION CLUTCH AND REVERSING MECHANISM
Filed June 25, 1953   5 Sheets-Sheet 1

THOMAS O. SUMMERS, JR.
ROMAN J. DOLUDE
INVENTORS

BY R. E. Geauque

ATTORNEY

THOMAS O. SUMMERS, JR.
ROMAN J. DOLUDE
INVENTORS

BY R. E. Geangue

ATTORNEY

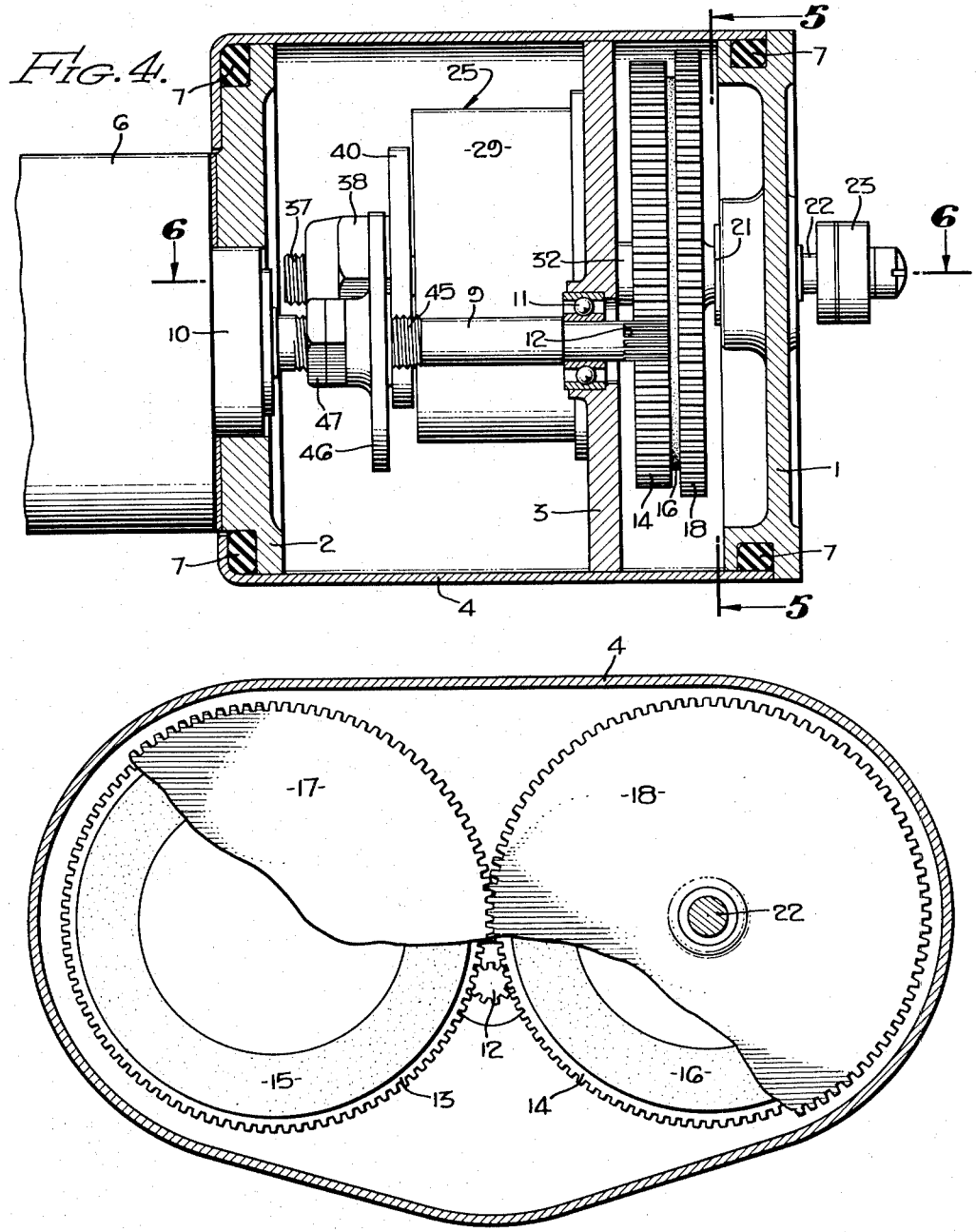

Nov. 22, 1955 T. O. SUMMERS, JR., ET AL 2,724,281
SELF-ADJUSTING FRICTION CLUTCH AND REVERSING MECHANISM
Filed June 25, 1953 5 Sheets-Sheet 4

THOMAS O. SUMMERS, JR.
ROMAN J. DOLUDE
INVENTORS

BY R. E. Geauque

ATTORNEY

Nov. 22, 1955 T. O. SUMMERS, JR., ET AL 2,724,281
SELF-ADJUSTING FRICTION CLUTCH AND REVERSING MECHANISM
Filed June 25, 1953 5 Sheets-Sheet 5

THOMAS O. SUMMERS, JR.
ROMAH J. DOLUDE
INVENTORS

BY R. E. Geauque

ATTORNEY

United States Patent Office 2,724,281
Patented Nov. 22, 1955

2,724,281

SELF-ADJUSTING FRICTION CLUTCH AND REVERSING MECHANISM

Thomas O. Summers, Jr., Sherman Oaks, and Roman J. Dolude, Los Angeles, Calif.; said Dolude assignor to Summers Gyroscope Company, Santa Monica, Calif., a corporation of California Application June 25, 1953, Serial No. 364,177

17 Claims. (Cl. 74—361)

This invention relates to self-adjusting friction clutches and, more particularly, to self-adjusting friction clutches of the type which are engaged by electromagnets.

Friction clutches of the electromagnetic type now in use have the disadvantage that the output characteristic of the clutches continually changes, because of wear of the clutch faces and because of expansion and contraction of the frictional material due to temperature changes. Of course, when the friction material is worn, the output of the clutch will be increased from the output when the material was first new, because of the decrease in air gap, and thus, for a given clutch input, the clutch output will continually increase over the period that the wear takes place. Also, because the friction material is subject to expansion and contraction, the temperature environment in which the clutch is used will control the air gap and the output characteristics. When the friction materials expand, the output will decrease, and when the materials contract, the output will increase for any given input. This change in output characteristics because of wear and temperature effect is highly undesirable, and makes it exceedingly difficult to design clutches for any given installation.

By the present invention, a self-adjusting clutch is provided which automatically compensates for the wear of the clutch plates and for the expansion and contraction of the clutch plates due to temperature changes. This is accomplished by using an electromagnet to engage the clutch surfaces and by utilizing an armature for the electromagnet which can move relative to one of the clutch faces attached thereto, in order to automatically provide a constant minimum air gap and to insure that a constant engaging force is applied between the clutch faces. The armature can be threaded onto the shaft of a movable clutch plate so that it can move into contact with the electromagnet surface and out of contact with the surface, depending upon the conditions of the clutch plate, in order to continually adjust the force with which the plates are held together, and thereby continually adjust the output of the clutch so that the output will remain constant. Means are also provided for preventing the armature from being moved out of the field of the electromagnet so that the electromagnet can continually exert the required force upon the clutch plates. Thus, the present invention provides a friction type of clutch, in which the output characteristics are pre-determined and, because of the self-adjusting feature of the clutch, there will be no change in these output characteristics. The clutch can, therefore, be used in installations where it is important that the output be continually in direct ratio to the input of the clutch.

It is, therefore, an object of the present invention to provide a self-adjusting clutch, whose output characteristics are unaffected by wear of the clutch or by expansion and contraction of the clutch plate materials due to temperature changes.

A further object of the present invention is to provide a self-adjusting, friction-type clutch, which is engaged by electromagnets and which is provided with means for applying a constant engaging force to the clutch plates regardless of the condition of these plates.

A still further object of the present invention is to provide a clutch which automatically compensates for wear and expansion of the friction material forming the clutch plates by providing an armature which can move relative to one of the clutch plates and which is adjustable relative to the plate.

A still further object of the present invention is to provide a self-adjusting friction clutch which is engaged by an electromagnet, and which provides that the position of the armature relative to the movable clutch plate can be adjusted without moving the armature out of the field of the electromagnet.

Another object of the invention is the provision of a self-adjusting clutch of the electromagnetic type in which the air gap is automatically maintained constant at the minimum possible amount so that it is unnecessary to reset the air gap upon change in condition of the clutch plates.

These, and other objects of the invention not specifically enumerated above, will be readily apparent from the following specification and drawings, in which:

Fig. 4 is a transverse vertical section along line 4—4 of Figs. 2 and 3, showing one of the clutch plates in full engagement and the normal clearance between the armature and electromagnet for this clutch.

Fig. 5 is a vertical sectional view along line 5—5 of Fig. 4, illustrating the drive for the clutch.

Figure 1:
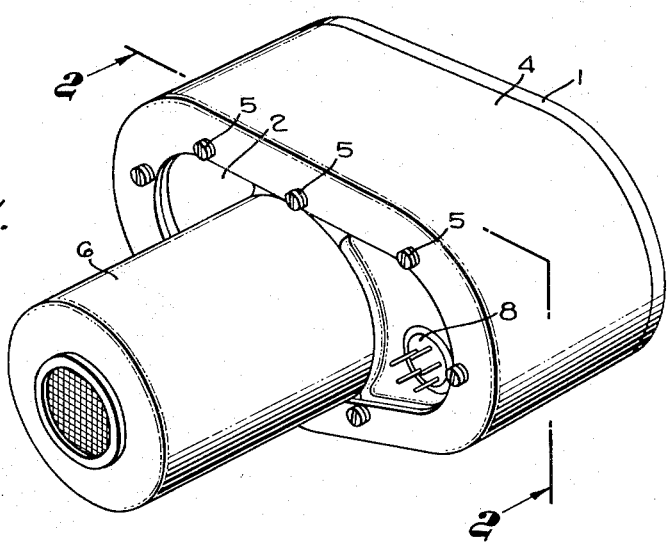
Fig. 1 is a perspective view of the clutch mechanism of this invention, showing the casing for the clutch motor and clutch parts.
Figure 2:
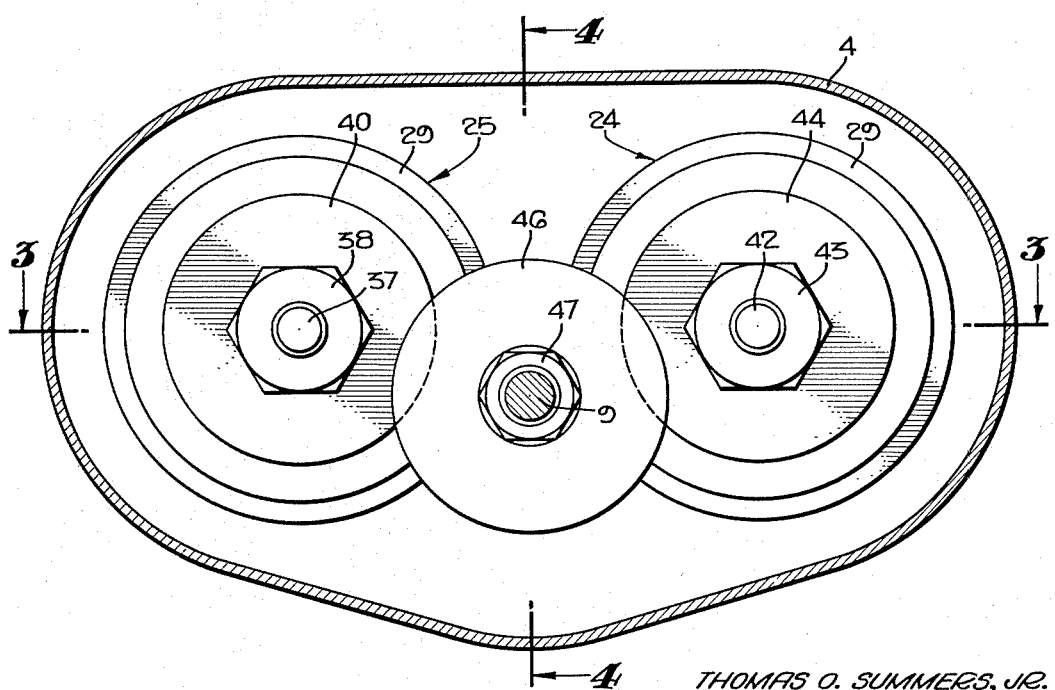
Fig. 2 is a vertical sectional view along line 2—2 of Fig. 1, illustrating the two electromagnets and their armatures in relation to the driving disc.

The embodiment of the invention first chosen for illustration has a pair of end support plates 1 and 2 and an intermediate support plate 3. These support plates are enclosed by a cover 4 which is received by support plate 1 and is secured to support plate 2 by means of screws 5. The support plate 2 has an extension for supporting the clutch motor 6, which is utilized to drive the clutch, and sealing rings 7 are provided for members 1 and 2 to give an air-tight compartment for the rotating clutch members. The support plate 2 has an opening for receiving the electrical connection plug 8, which serves to transmit the required electrical power to the electrical operating parts of the clutch. The drive shaft 9 for the clutch is connected to motor 6 and is mounted by bearing 10 in supporting plate 2 and by bearings 11 in supporting plate 3. The end of shaft 9 has a pinion gear 12 which engages with gears 13 and 14, which carry, on their faces, clutch plates 15 and 16, respectively. These clutch plates can be constructed of any suitable frictional material and are adapted to move into driving relationship with output gears 17 and 18, respectively. It will be noted that pinion gear 12 drives gears 13 and 14 in the same directions, and that gears 17 and 18 are meshed together so that gear 18 will be driven in one direction by clutch plate 16 and will be driven in the opposite direction by clutch plate 15 when engaged. The gear 17 is supported by a pair of ball bearings 19, which receive shaft 20 for the gear, and gear 18 is supported by a pair of ball bearings 21 which receive output shaft 22 connected to gear 18. The bearings 19 and 21 are retained in support member 1 and an output arm 23 is rigidly secured to shaft 22 and can be connected to any instrumentality which is adjustable by the clutch.

A pair of electromagnets 24 and 25 are supported by support member 3 and each electromagnet consists of a core member 26 secured in an opening in the support member. The core 26 supports a winding retainer member 27 and also the winding 28 of the electromagnet. The cover 29 is likewise secured in support plate 3 and extends around the winding 28 and carries an end closure ring 30 for positioning the member 27 and winding 28. The shafts 31 and 32 for gears 13 and 14, respectively, are mounted in the circular openings 33 of the cores 26 for both of the electromagnets, by means of a pair of needle bearings 34 pressed into position in these openings. The shafts 31 and 32 are secured to gears 13 and 14 by means of keys 35 and the gears are retained in position on the shaft by retainer rings 36 positioned on each side of the gear hub. Thus, the gears 13 and 14 will move with shafts 31 and 32, respectively, and these shafts are free to move through the needle bearings 34 relative to the stationary windings of the electromagnet.

The shaft 32 has a threaded section 37 which receives a nut 38 having a knurled extension 39. The armature 40 for the electromagnet, which is likewise the adjusting disc for the clutch, has a center opening which is forced over the knurled section 39, and the section is then bent over to securely attach the armature 40 rigidly with the nut 38. A fiber thread section 41 is retained in an end opening in nut 38 for the purpose of gripping the threaded section 37 in order to keep the nut 38 from spinning when rotational movement is applied thereto. The shaft 31 has a threaded section 42, similar to section 37 of shaft 32, which receives a nut 43 to which is attached an armature 44 for electromagnet 24. The armature 44 is secured to nut 43 in the same manner as armature 40 is secured to nut 38, and nut 43 has a fiber thread section similar to section 41 for nut 38. It will thus be apparent that when electromagnet 25 is energized, the adjusting disc 40 will be pulled toward the electromagnet and force clutch plate 16 into engagement with gear 18, in order to drive gear 18 and output arm 23 in one direction. Also, when electromagnet 24 is energized, the adjusting disc (armature) 44 will be pulled toward the electromagnet and will force clutch plate 15 into engagement with gear 17, thus driving gear 18 and output arm 23 in the opposite direction.

Figure 3:
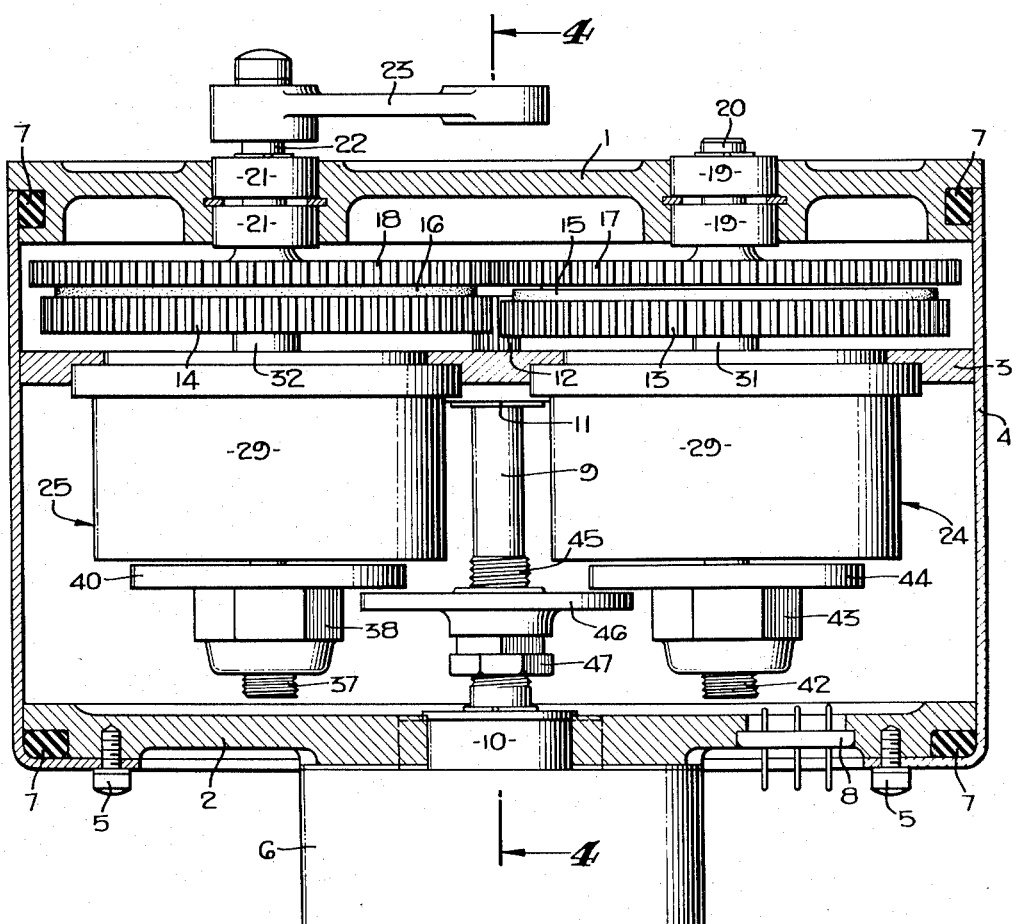
Fig. 3 is a horizontal sectional view along line 3—3 of Fig. 2, showing one pair of the clutch plates in engagement and the other pair in disengaged position.

The shaft 9 has a threaded section 45 onto which is threaded a driving disc 46. This disc is positioned the desired distance from the ends of electromagnets 24 and 25 for reasons later to be explained. A lock nut 47 secures the disc 46 to shaft 9 so that the disc 46 will continually rotate with shaft 9 in the same direction without changing its position on the shaft. Under normal operating conditions, the adjusting discs 40 and 44 will assume the positions relative to the electromagnets illustrated in Fig. 3, wherein electromagnet 25 is energized and electromagnet 24 is de-energized. It will be noted that clutch plate 16 is in engagement with gear 18 and that there is a slight air gap between adjusting disc 40 and the end of electromagnet 25. Also, it will be noted that adjusting disc 44 is positioned away from the end of electromagnet 24 so that the clutch plate 15 is not in engagement with the face of gear 17. Of course, if the energization of the electromagnets were reversed, clutch face 15 would engage gear 17 and the clutch face 16 would disengage gear 18, and the position of the adjusting discs 40 and 44 relative to the electromagnets would be reversed, as would be the direction of output of the clutch.

Figure 6:
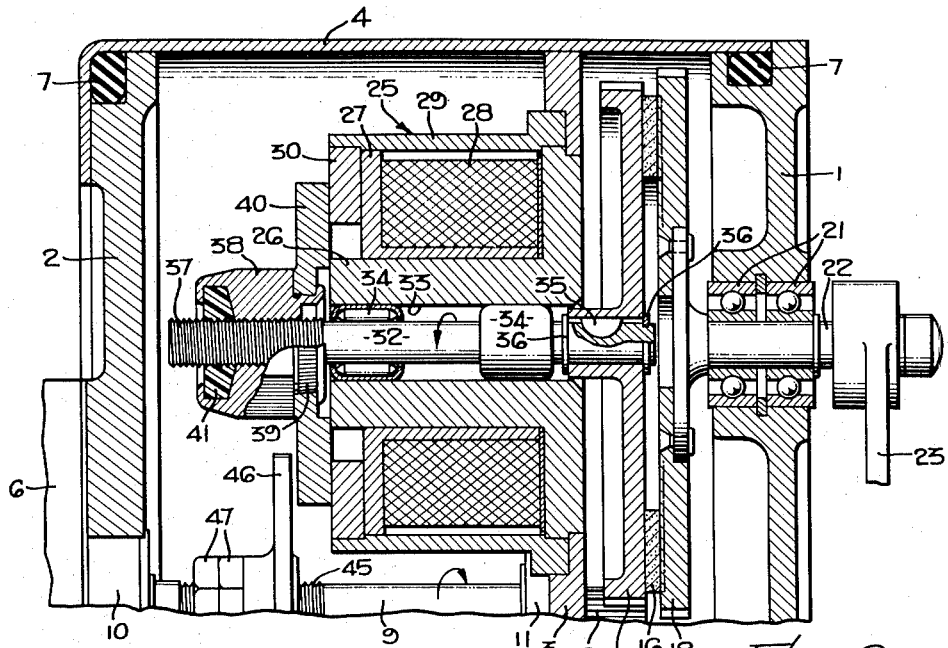
Fig. 6 is a horizontal sectional view along line 6—6 of Fig. 4, with the clutch plate worn in the amount indicated by the dotted line, and showing the adjusting armature disc in contact with the electromagnet surface in order to move the clutch plate forward.

The self-adjusting feature of the clutch will now be explained in connection with Figs. 6, 7 and 8, and it is pointed out that the direction of rotation of the various clutch members is indicated by the arrows in the figures. Referring to Fig. 6, the clutch face 16 is shown in a worn condition and worn by an amount equal to the difference between the clutch face and the dotted outline. With the clutch face 16 in this condition and the electromagnet 25 energized, the adjusting disc 40 will be drawn into contact with ring 30 of electromagnet 25. Since the shaft 32 is continually rotated by shaft 9, and since adjusting disc 40 will be held stationary against the electromagnet, the disc 40 will unscrew on shaft 32 and will cause gear 14 and clutch face 16 to move forward against the face of gear 18, thus increasing the output of the clutch. However, when the engaging force of the clutch becomes great enough to overcome the pull of electromagnet 25 on adjusting disc 40, the disc 40 will be moved out of contact with the electromagnet and will then rotate with shaft 32 while still being under the influence of the force of the magnet. The fiber section 41 prevents the clutch plate from rotating freely on the threaded section 37 so that in the absence of other forces on the clutch plate, the clutch plate will rotate with shaft 32. Thus, when the contact between the disc 40 and the electromagnet 25 is broken, the electromagnetic force on the disc 40 will remain constant while disc 40 is rotating and will maintain the clutch face 16 in contact with gear 18 with a constant force equal to the pull on adjusting disc 40. When the clutch plate wears appreciably again, the disc 40 will be pulled into contact again with the electromagnet and allow the clutch plate 16 to move forward against the gear 18 to adjust the contact pressure. Under normal operating conditions, however, and once the contact force of the clutch is adjusted, the disc 40 will maintain a constant pressure on the clutch and will remain a constant distance out of contact with the electromagnet, which distance will correspond to the minimum possible air gap.

Figure 7:
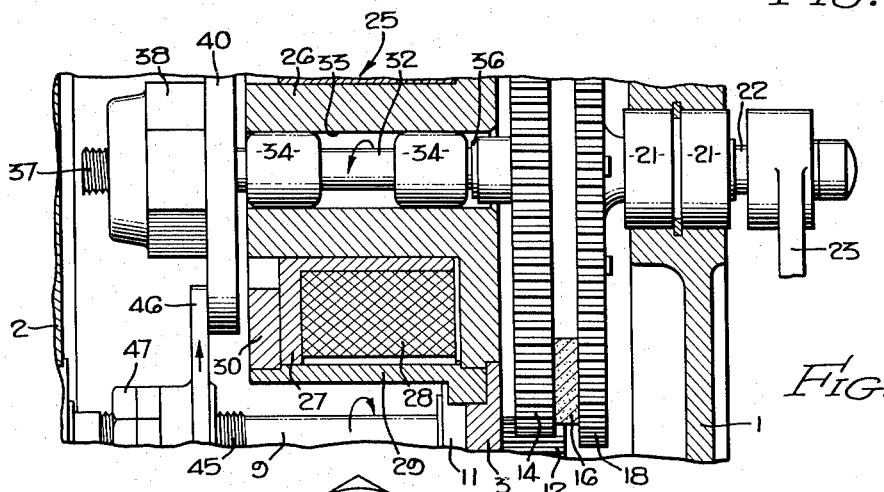
Fig. 7 is a horizontal sectional view similar to that of Fig. 6, showing the clutch plate expanded by the amount indicated by the dotted line, and showing the adjusting armature disc in contact with the driving disc in order to move the clutch plate rearwardly.
Figure 8:
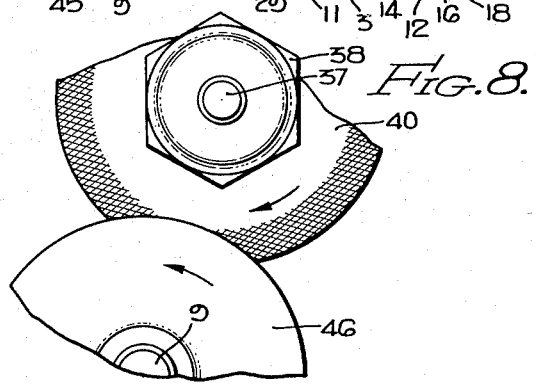
Fig. 8 is an elevational view of the adjusting armature disc and the driving disc, and showing the direction of relative rotation between these two discs.

Referring to Fig. 7, in the event that the clutch plate 16 expands due to temperature changes a distance indicated between the clutch plate and the dotted line in the figure, the adjusting disc 40 will be forced rearwardly away from the electromagnet 25 when sufficient force is developed due to this expansion to overcome the force of the electromagnet 25. However, the disc 40 is not permitted to leave the field of the electromagnet since it will be moved into contact with driving disc 46 and rotated on shaft 32 back toward the electromagnet. It will be noted that disc 46 is continually rotated in the same direction as shaft 9, and that shaft 32, driven by shaft 9, is continually rotated in the opposite direction. Therefore, when the two discs come into contact, disc 46 will rotate disc 40 in a direction to move the disc back toward the magnet, thus allowing clutch plate 16 to move away from the face of gear 18 a sufficient distance to allow the proper clutch output to be developed. At the same time, the disc 40 will continue to exert a constant pressure upon the face of disc 18 equivalent to the attraction force of the electromagnet. Of course, if further expansion of the clutch face 16 occurs, a further adjustment will be made in the manner just described.

While the description of the operation of the clutch has been in connection with electromagnet 25, it is obvious that the adjusting disc 44 will be adjusted in the same manner as described in connection with adjusting disc 40 when electromagnet 24 is energized, and that the driving disc 46 will engage the disc 44 in the same manner to decrease the clutch output when the clutch face has expanded due to temperature changes. It is therefore apparent that the clutch just described provides a device that gives a constant minimum air gap and a constant clutch output regardless of the condition of the clutch plates and whether the clutch plate has been worn or has been expanded or contracted due to temperature changes. By providing a constant engaging force between the clutch plates and the output gears, a constant output force will be transmitted to output lever 23 regardless of which electromagnet has been energized, since both electromagnets exert a constant magnetic force upon their respective driving discs.

Figure 9:
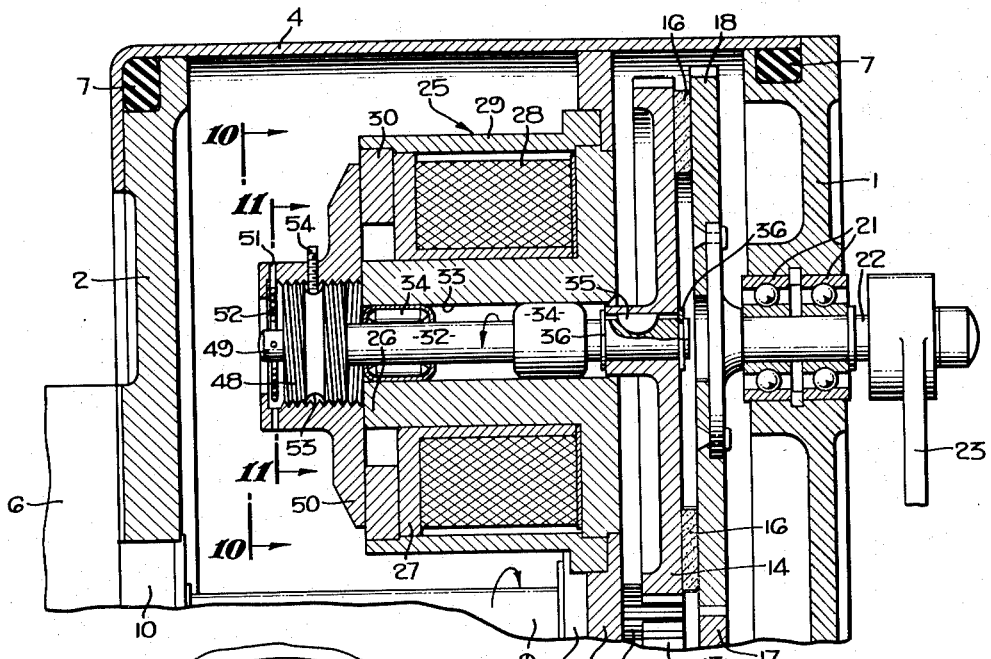
Fig. 9 is a horizontal sectional view similar to Fig. 6, of a modification of the present invention, in which a coil spring is connected to the adjusting armature disc in the place of the driving disc of the previous embodiment.

A modification of the invention is illustrated in Figs. 9 through 12, and this modification eliminates the need for the driving disc 46 to prevent either adjusting disc from moving away from its corresponding electromagnet. Like numerals will represent like parts, as in the previous description. In Fig. 9, the shaft 32 is shown having an enlarged threaded section 48 and a decreased end section 49. The armature adjusting disc 50 is received by threaded portion 48 and has an opening 51 for receiving one end of a coil spring 52. The coil spring is positioned within the adjusting disc 50 and has its other end secured to end section 49 of shaft 32. In order to insure that the adjusting disc 50 will not be threaded off of threaded section 48, this section is provided with a groove 53 into which projects a screw 54 carried by disc 50. However, such a precaution is not necessary, since the armature 50 will not move any sufficient amount relative to shaft 32 during operation of the device. In Fig. 9, clutch plate 16 is shown in normal engaging position for transmitting the constant clutch output, and a minimum air gap exists between disc 50 and electromagnet 25 under normal operating conditions. The coil spring 50 serves the purpose of constantly urging the adjusting disc 50 into contact with the electromagnet 25, and, of course, when such contact does take place, the disc 50 will move relative to the shaft 32.

Figure 10:
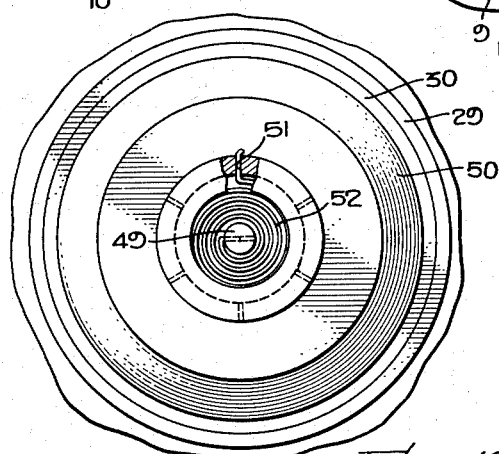
Fig. 10 is an elevational view along line 10—10 of Fig. 9, illustrating the manner in which the coil spring connects the clutch shaft to the adjusting armature disc.
Figure 11:
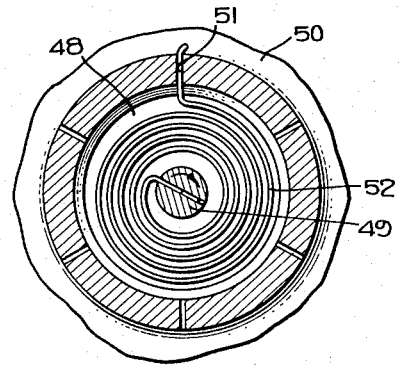
Fig. 11 is a vertical sectional view along line 11—11 of Fig. 9, and illustrating the relationship between the adjusting armature disc and the clutch shaft when the clutch plate is adjusted forward to compensate for wear.

In the operation of the modification just described, Fig. 10 shows the position of opening 51 in disc 50 relative to the end section 49 of shaft 32 under normal operating conditions as discussed in connection with Fig. 9. In Fig. 11, the position of disc 50 relative to shaft 32 is illustrated, when the clutch plate has worn away to the extent that it must be moved forward into greater contact with driving gear 18 in order to produce the required constant clutch output. Under such conditions, disc 50 will be moved by the force of the electromagnet 25 into contact with ring 30 of the electromagnet and the disc 50 will be held while the shaft 32 and clutch plate 16 are threaded forward into greater contact with the gear 18. At such time as the clutch plate develops sufficient engaging force to overcome the force of the electromagnet on disc 50, the disc 50 will be moved away from the electromagnet and thereafter will rotate with shaft 32 until such time as the force on disc 50 again becomes greater than the engaging force of the clutch plate. After the adjustment has been made, the shaft 32 will have been rotated in the direction of arrow 11 an amount corresponding to the actual adjustment required, and it is noted that the end section 49 of shaft 32 has been displaced from opening 52 in the disc 50.

Figure 13:
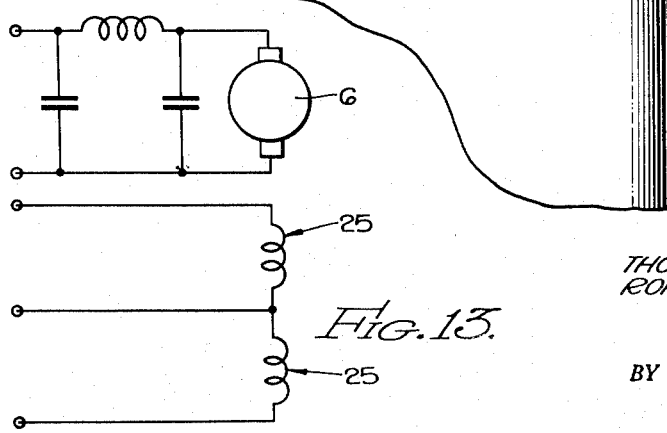
Fig. 13 is a schematic wiring diagram for the two electromagnets of the clutch and for the clutch motor.
Figure 12:
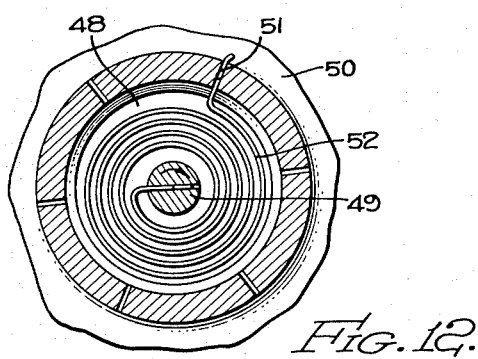
Fig. 12 is a vertical sectional view similar to that of Fig. 11, illustrating the relative position of the adjusting armature disc to the clutch shaft when adjustment is being made for an expanded clutch member.

Fig. 12 shows the relative position of adjusting disc 50 to shaft 32 for the condition in which the clutch face has expanded due to temperature change and requires adjustment of the clutch face away from the gear 18. Due to the expansion of the clutch face, the engaging force of the clutch will overcome the force of electromagnet 25 on disc 50 and will cause disc 50 to move away from the electromagnet. At such time, however, the force of coil spring 52 will rotate the disc 50 on threaded section 48 in a forward direction toward the electromagnet, until the normal operating condition is obtained, whereby the engaging force of the clutch is just equal to the pull of the electromagnet. The adjusted position of the disc 50 relative to shaft 32 is indicated in Fig. 12 by the position of opening 51 relative to the end section 49, and it will be noted that the opening 49 has moved in the direction of the arrow a distance corresponding to the movement of clutch face 16 away from gear 18. The coil spring 52 thus provides a means for continually urging the disc 50 in a direction toward the electromagnet 25, and in the event that the disc 50 engages the electromagnet 25, it will be forced away from the electromagnet when the clutch-engaging force is equal to the force of the electromagnet. Under normal operating conditions, the disc will assume a position slightly out of contact with the ring 30 of the electromagnet to automatically provide a minimum air gap and will exert a constant engaging force on the clutch without hunting back and forth along shaft 32. The action of coil spring 52 differs from the action of driving disc 46 of the previously described embodiment, only in that the coil spring continually exerts a force upon the adjusting disc, whereas driving disc 46 is effective only when it engages the adjusting disc. Otherwise, the clutches of the two modifications will operate in the same manner. The electrical circuit for the clutch is illustrated in Fig. 13 wherein the electromagnets 24 and 25 are shown with a common terminal, while a noise filter is shown incorporated in the circuit for motor 6.

By the present invention, a constant-output clutch is provided which maintains uniform output characteristics over a period of time without the necessity of continually adjusting the air gap. Because of the fact that the engaging force of the clutch is continually constant regardless of the worn condition of the clutch faces or the expansion or contraction of the clutch faces due to temperature changes, the clutch can be used for a wide variety of control purposes and, of course, is reversible in the manner that has been described. It is apparent that the output characteristic of the clutch can be modified by modifying the attractive force of the electromagnets incorporated within the clutch. Also, other types of force-producing means other than electromagnets can be utilized to develop an equivalent engaging force for the clutch, and other mechanisms can be used to allow the clutch shaft to be adjusted along the axis of the clutch to modify the clutch-engaging force. While the invention has been described in connection with friction-type clutches, it is obvious that it can be utilized with other types of clutches, so long as the clutch-engaging force can be matched with a constant force. Various other modifications of the subject invention are contemplated, and may obviously be resorted to by those skilled in the art, without departing from the spirit and scope of the invention as hereinafter defined by the appended claims.

What is claimed is:

1. A self-adjusting clutch comprising a driven member, a driving member movable into driving relationship with said driven member, an adjustable armature disc carried by said driving member and movable relative to said driving member in the direction of said engagement, means for rotating said driving member and said armature disc, force-applying means operative upon said armature disc to force said driving member into engagement with said driven member, and means for automatically adjusting the position of said armature disc axially in both directions with respect to said driving member in order for said force-applying means to maintain a constant engaging force upon said armature disc.

2. A self-adjusting clutch comprising a rotatable driven member, a rotatable driving member movable into driving engagement with said driven member, armature means carried by said driving member and movable with respect to said driving member, means for exerting a force upon said armature means to move said driving member into driving engagement with said driven member, and means for automatically moving said armature axially in both directions relative to said driving member in order to maintain a constant minimum distance between said force-exerting means and said armature, said armature thereby transmitting a constant engaging force between said driving and driven members.

3. A self-adjusting clutch comprising a rotatable driven member, a rotatable driving member movable into driving engagement with said driven member, armature means carried by said driving member and movable relative to said driving member along the engaging axis of said members, means for exerting a force upon said armature to maintain said driving member in driving contact with said driven member, and means for automatically adjusting the position of said armature means axially in both directions relative to said driving member to maintain a constant clutch-engaging force upon said armature means regardless of the condition of the contact surfaces of the driven and driving members.

4. A self-adjusting friction clutch comprising a rotatable driven member and a rotatable driving member, armature means carried by said driving member and movable relative thereto, electromagnetic means for exerting a clutch-engaging force upon said armature, means to move said driving member into driving engagement with said driven member, and means for automatically adjusting the position of said armature axially in both directions relative to said electromagnetic means in order to maintain a constant minimum air gap therebetween.

5. A self-adjusting clutch comprising a rotatable driven member, a rotatable driving member movable into driving engagement with said driven member, an armature carried by said driving member and movable relative to said driving member, electromagnetic means for applying a clutch-engaging force to said armature, and means for automatically adjusting the position of said armature axially in both directions relative to said driving member in order to maintain a constant force upon said armature by said electromagnetic means.

6. A self-adjusting clutch as defined in claim 5, wherein said adjusting means comprises a stationary member engaged by said armature to move the armature away from said driving member when the engaging force between said members is less than the force of said electromagnetic means, and a constantly rotating member engaged by said armature to move said armature toward said driving member when the engaging force between said members is greater than said electromagnetic force-appyling means.

7. In a self-adjusting clutch, a driven member mounted for rotation, a driving member mounted for rotation and having a clutch plate movable into engagement with said driven member to drive said driven member, an armature threaded upon an extension of said driving member for movement relative thereto, an electromagnet operative upon said armature to force said clutch plate into engagement with said driven means, said armature being pulled into physical engagement with said electromagnet when said clutch plate is worn in order to move the armature away from said driven member and thereby maintain a constant air gap, and rotatable means for engaging said armature when said clutch plate is expanded to move said armature closer to said driving member and maintain said air gap constant.

8. In a self-adjusting clutch, a driven member mounted for rotation, a driving member mounted for rotation and having a clutch plate movable into engagement with said driven member to drive said driven member, an armature threaded upon an extension of said driving member for movement relative thereto, an electromagnet operative upon said armature to force said clutch plate into engagement with said driven means, said armature being pulled into physical engagement with said electromagnet when said clutch plate is worn in order to move the armature away from said driven member and thereby maintain a constant air gap, spring means connecting said armature to said extension for continually urging said armature toward said electromagnet, said spring means moving said armature closer to said driving member when said clutch plate expands in order to maintain said constant air gap.

9. In a self-adjusting clutch, a driven member, a driving member movable axially into engagement with said driven member to drive said driven member, a clutch plate positioned on said driving member and between said driving member and said driven member, an armature threaded onto an extension of said driving member to rotate and move axially relative to said driving member, an electromagnet positioned to exert a clutch-engaging force upon said armature, said armature being pulled into physical engagement with said electromagnet when said clutch plate becomes worn to thereby cause rotation of said armature relative to said driving member and adjustment of the force exerted by said driving member on said driven member, and rotating means engageable by said armature when said clutch plate expands to rotate said armature relative to said driving member and prevent said armature from moving out of the field of said electromagnet.

10. In a self-adjusting clutch as defined in claim 9, a friction thread-engaging material carried by said armature so that said armature will rotate with said driving member when said armature is out of contact with said electromagnet and said rotating means.

11. In a self-adjusting clutch, a driven member, a driving member movable axially into engagement with said driven member to drive said driven member, a clutch plate positioned on said driving member and between said driving member and said driven member, an armature threaded onto an extension of said driving member to rotate and move axially relative to said driving member, an electromagnet positioned to exert a clutch-engaging force upon said armature, spring means connecting said armature to said extension for constantly urging said armature toward said electromagnet, said spring means serving to maintain a constant air gap between said electromagnet and said armature by moving said armature toward said electromagnet when said clutch plate expands and by allowing said armature to move away from said electromagnet when said clutch plate contracts or becomes worn and causes physical contact between the armature and the electromagnet.

12. In a self-adjusting friction clutch, a rotatable driven member and a rotatable driving member, said driving member being movable toward and away from said driven member, a friction clutch plate mounted on said driving member in position between said driving member and said driven member, a shaft carried by said driving member, an armature threaded onto said shaft for movement toward and away from said driving member, an electromagnet positioned between said driving member and said armature to exert a clutch-engaging force upon said driving member through said armature, said armature being pulled into physical engagement with said electromagnet when said clutch plate is worn and held against rotation with said driving member until the engaging force between said members equals the force of said electromagnet, and rotating means engaged by said armature to rotate said armature toward said electromagnet when said clutch plate expands so that said armature will not be moved away from the field of said electromagnet, the air gap between said electromagnet and said armature being maintained at the minimum constant value regardless of the condition of said clutch plate.

13. In a self-adjusting friction clutch as defined in claim 12, a frictional thread-engaging member carried by said armature to engage the threads on said shaft and cause said armature to rotate with said driving member during the time said armature is out of contact with said electromagnet and said rotating means.

14. In a self-adjusting friction clutch, a rotatable driven member, and a rotatable driving member axially movable into and out of engagement with said driven member, a friction clutch plate mounted on said driving member between said driven member and said driving member, an armature mounted on an axial extension of said driving member for movement toward and away from said driven member, a stationary electromagnet positioned between said armature and said driven member for exerting a clutch-engaging force upon said armature, spring means connecting said armature to said shaft for constantly urging said armature in the direction of physical engagement with said electromagnet, said spring means serving to constantly adjust the air gap between said electromagnet and said armature by moving said armature toward said electromagnet when said clutch plate expands and by allowing said armature to move away from said electromagnet when said clutch plate contracts or becomes worn.

15. In a forward and reverse transmission, a pair of rotatable driving members rotated in the same direction by a driving shaft, a pair of rotatable driven members, a friction clutch plate positioned upon the face of each of said driving members for driving engagement with each of said driven members, an output arm connected to one of said driven members, said driven members being geared together to drive said output arm in opposite directions depending upon which clutch face is engaging which driven member, an axial extension secured to each of said driving members and having an armature threaded thereon for movement relative to the driving member, a stationary electromagnet positioned between each driving member and each armature for applying a clutch-engaging force to each clutch face through the corresponding armature, means for energizing one or the other of said electromagnets to drive said output arm, each armature being pulled into physical engagement with its corresponding energized electromagnet when its associated clutch plate has contracted or become worn, said physical engagement causing said armature to move away from said driving member until a minimum air gap is produced between said armature and said electromagnet, a driving disc mounted for continual rotation and positioned to engage either of the armatures being acted upon by its electromagnet and move same toward its corresponding driving member in order to maintain the minimum air gap when its corresponding clutch face expands, each armature thereby being constantly adjusted to maintain a minimum air gap between its energized electromagnet and said armature and to permit said armature to normally rotate with its corresponding driving member.

16. In a forward and reverse transmission, a pair of rotatable driving members rotated in the same direction by a driving shaft, a pair of rotatable driven members, a friction clutch plate positioned upon the face of each of said driving members for driving engagement with each of said driven members, an output arm connected to one of said driven members, said driven members being geared together to drive said output arm in opposite directions depending upon which clutch face is engaging which driven member, an axial extension secured to each of said driving members and having an armature threaded thereon for movement relative to the driving member, a stationary electromagnet positioned between each driving member and each armature for applying a clutch-engaging force to each clutch face through the corresponding armature, means for energizing one or the other of said electromagnets to drive said output arm, each armature being pulled into physical engagement with its corresponding energized electromagnet when its associated clutch plate has contracted or become worn, said physical engagement causing said armature to move away from said driving member until a minimum air gap is produced between said armature and said electromagnet, spring means connecting each of said armatures to its axial extension for constantly urging said armature into physical engagement with its corresponding electromagnet, said spring means moving each armature toward its energized electromagnet when the associated clutch face becomes expanded to maintain a minimum air gap, and said spring means preventing each armature from moving away from its energized electromagnet when said clutch face becomes worn in order to maintain the minimum air gap.

17. In a forward and reverse transmission, a pair of rotatable driving members rotated in the same direction by a driving shaft, a pair of rotatable driven members, a friction clutch positioned upon the face of each of said driving members for driving engagement with each of said driven members, an output arm connected to one of said driven members, said driven members being geared together to drive said output arm in opposite directions depending upon which clutch face is engaging which driven member, an axial extension secured to each of said driving members and having an armature threaded thereon for movement relative to the driving member, a stationary electromagnet positioned between each driving member and each armature for applying a clutch-engaging force to each clutch face through the corresponding armature, means for energizing one or the other of said electromagnets for driving said output arm, each armature being pulled into physical engagement with its corresponding energized electromagnet when its associated clutch plate has contracted or become worn, said physical engagement causing said armature to move away from said driving member until a minimum air gap is produced between said armature and said electromagnet, and means associated with each of said armatures for causing said armture being acted upon by said electromagnet to move toward its corresponding driven member sufficiently to maintain the minimum air gap when its corresponding clutch face expands, each armature thereby being constantly adjusted to maintain a minimum air gap between its energizing electromagnet and said armature and to permit said armature to normally rotate with its corresponding driving member.

References Cited in the file of this patent

UNITED STATES PATENTS

| | | |
|---|---|---|
| 1,049,957 | Whitcomb | Jan. 7, 1913 |
| 1,056,243 | Whitcomb | Mar. 18, 1913 |
| 2,527,830 | Lilja | Oct. 31, 1950 |
| 2,556,318 | Cooper | June 12, 1951 |
| 2,692,035 | Rabinow | Oct. 19, 1954 |